UNITED STATES PATENT OFFICE.

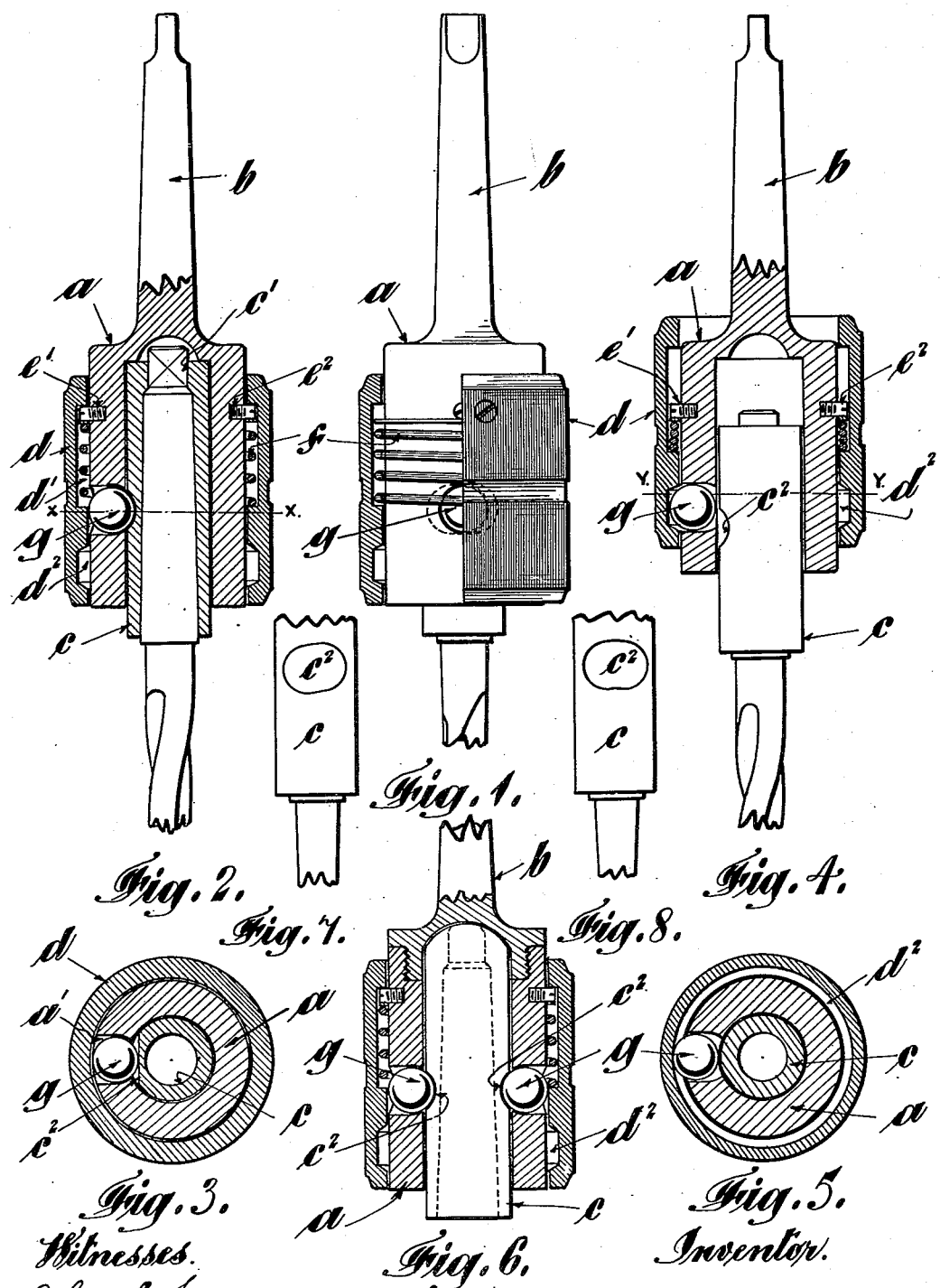

WILLIAM ARTHUR WEAVER, OF COVENTRY, ENGLAND.

TOOL-HOLDER.

1,124,981.  Specification of Letters Patent.  Patented Jan. 12, 1915.

Application filed February 20, 1913. Serial No. 749,622.

*To all whom it may concern:*

Be it known that I, WILLIAM ARTHUR WEAVER, a subject of the King of Great Britain and Ireland, and resident of Coventry, Warwickshire, England, have invented certain new and useful Improvements in Tool-Holders, of which the following is a specification.

This invention, which refers to and consists of a quick release ball clutch or tool holder, has for its object a clutch or holder capable of being used in any position, horizontal, vertical or angular, while affording a positive connection in all positions.

Upon the accompanying drawing, Figure 1 illustrates a side exterior view (partly in section) and Fig. 2 a complete longitudinal section of a tool holder embodying the invention. Fig. 3 illustrates a transverse section of Fig. 2 on line $x-x$. Fig. 4 illustrates a further longitudinal section of the holder, but showing certain of the parts in a different position to that shown in Fig. 2. Fig. 5 illustrates a sectional plan of Fig. 4 on line $y-y$. Fig. 6 illustrates a longitudinal section of a modified construction of holder. Figs. 7 and 8 illustrate modifications of a detail.

According to the invention, the holder comprises the hollow cylindrical part $a$ with solid shank $b$. Fitting within such holder is a hollow cylindrical bush $c$, the exterior of the bush being cylindrical and neatly fitting the holder, see Fig. 2. This bush is preferably formed with a "Morse" taper bore to suit the usual "Morse" taper of say the drill or other tool to be held. At its smaller end the bore terminates in a rectangular shaped opening $c'$ designed to receive the end of the drill which when in position projects through the opening $c'$ and slightly beyond the end of the bush.

Encircling the holder and free to move along or around it is a sleeve $d$. In the inner face of this sleeve are annular recesses $d'$, $d^2$, the former being formed with rectangular shoulders, and the latter being formed with beveled shoulders.

Projecting from the holder are two pins $e'$, $e^2$, which extend into the recess $d'$ and thereby retain the sleeve on the holder. Within the recess $d'$ and encircling the holder $a$ is a coiled spring $f$, and by means of this spring the sleeve is normally held in the position shown in Figs. 1 and 2.

In the wall of the cylindrical part $a$ of the holder is a through opening $a'$, and in the periphery of the bush $c$ is a groove $c^2$, formed preferably by a milling cutter. Within the said opening $a'$ is a hardened steel ball $g$, the diameter of which is such that, when the sleeve $d$ is in the position shown in Fig. 2, the ball touches the inner face of the sleeve at one side and the bottom of the groove $c^2$ in bush $c$ at the other side. With the ball $g$ thus held by the sleeve $d$ in engagement with the groove $c^2$, the ball will act as a "key" as between the holder and bush, and thus, on the holder being rotated in either direction, the bush, through the medium of the ball, will also be rotated. To free the bush the ball will require to retire from the groove. This is provided for by the recess $d^2$. That is to say, the sliding of the sleeve along the holder and toward its shank $b$, brings the recess $d^2$ opposite the ball $g$ as shown in Fig. 4, and, with nothing behind the ball to hold it in the groove $c^2$, the ball is immediately free to retire into the recess $d^2$ and thus free the bush, which may then be withdrawn. To reinsert and refix the bush in the holder the sleeve $d$ (if not already moved back) is first moved to the position shown in Fig. 4. The bush is then inserted in the holder, after which the sleeve is released and allowed to return to its original position whereupon the ball $g$ is caused to reënter the groove $c^2$ and thus again securely hold the bush in the holder. The insertion and removal of the bush can be done while the holder is in motion, the sleeve being readily held stationary and raised and lowered while the holder rotates, and the bush readily leaving the holder as the ball retires from the groove.

The pins $e'$, $e^2$, are preferably applied as follows: Holes are drilled and tapped in the holder, a hole is also drilled in the sleeve and through such hole first one pin and then the other is screwed into the holes in the holder, the holder being rotated to suit. The hole in the sleeve is then plugged up to exclude dirt. To prevent the ball $g$ leaving the opening $a'$ when the bush is out of the holder, that end next the inner face of the holder is burred over or reduced in diameter, see Fig. 4. To help in holding the bush tightly against the inner end of the holder the groove $c^2$ is slightly inclined, the ball acting to force the bush farther into the holder as well as rotate the bush, see Fig. 7.

If desired, the groove may be inclined upwardly in both directions from the center, and thus suit for tightening the bush in either direction of rotation, see Fig. 8.

In Fig. 2 the shank $b$ is shown as being made solid with the holder $a$, but in Fig. 6 it is shown as being made separate and screwed to the holder, so that if by any chance the shank becomes damaged a new one can be fitted.

In Fig. 6 two balls $g$, $g$ and two grooves $c^2$, $c^2$ are shown and the end of the bush and holder are spherical, thereby giving the bush a "floating" fit and insuring of a more certain clutch action. That is to say should one ball fail the other is there to act.

The improved holder will be made in various sizes, and each size will be provided with interchangeable bushes to suit the taper and size of the tool shank.

What I claim is:—

A clutch or tool holder comprising in combination, a hollow cylindrical part with tapered shank and said part having transverse openings in its wall, the inner end of each opening being of smaller diameter than the outer end, a sleeve rotatably and slidably mounted upon the exterior of said cylindrical part, said sleeve being close-fitting at three points and having annular recesses in its inner face, one of such recesses being comparatively short and bevel-ended while the other is comparatively long, means projecting from the said cylindrical part into the longer recess to hold the said sleeve to the cylindrical part, a further cylindrical part adapted to fit within the said hollow cylindrical part and having inclined grooves on its exterior, a hardened steel ball within each opening in the hollow cylindrical part and free to move therein, a spring encircling the first-named cylindrical part and lying in the said longer recess of the sleeve, and a washer between the spring and the said projections on first named cylindrical part, substantially as herein set forth.

In witness whereof I have hereunto set my hand in the presence of two witnesses.

WILLIAM ARTHUR WEAVER.

Witnesses:
ALBERT BROWN,
JOHN ARKLE.